United States Patent [19]

Moore et al.

[11] Patent Number: 4,616,580
[45] Date of Patent: Oct. 14, 1986

[54] ANHYDROUS KNIFE

[75] Inventors: Alan R. Moore, Parma; Nicholas M. Januszewski, Albion, both of Mich.

[73] Assignee: Hayes-Albion Corporation, Jackson, Mich.

[21] Appl. No.: 694,033

[22] Filed: Jan. 23, 1985

[51] Int. Cl.$^4$ ............................................. A01B 17/00
[52] U.S. Cl. ........................................ 111/7; 172/699
[58] Field of Search .............. 111/6, 7; 172/699, 700, 172/713, 719, 753, 745, 764

[56] References Cited

U.S. PATENT DOCUMENTS

| 2,439,743 | 4/1948 | McEwen | 97/78 |
| 2,598,121 | 5/1952 | Hannibal | 111/7 |
| 2,619,054 | 11/1952 | Bell | 111/7 |
| 2,684,617 | 7/1954 | Johnston | 172/699 |
| 2,849,970 | 9/1958 | Coberly et al. | 111/7 |
| 3,259,087 | 7/1966 | Horton | 111/7 |
| 3,605,657 | 9/1971 | Brannan | 111/7 |
| 3,919,951 | 11/1975 | Williams et al. | 111/7 |
| 4,033,271 | 7/1977 | Williams et al. | 111/7 |
| 4,132,181 | 2/1979 | Smith et al. | 111/7 |
| 4,201,142 | 5/1980 | Stump | 111/7 |

FOREIGN PATENT DOCUMENTS

| 1172107 | 8/1984 | Canada | 172/699 |
| 257961 | 5/1949 | Switzerland | 111/7 |

*Primary Examiner*—Richard J. Johnson
*Attorney, Agent, or Firm*—Beaman & Beaman

[57] ABSTRACT

A knife for dispensing anhydrous material within the subsoil consisting of a configured body of cast metal, the lower end defining a sacrificial mass providing the knife with excellent wear characteristics. A dispensing tube is cast within the body having orifices protected from plugging and a soil replacement and compacting element is homogeneously defined on the rear portion of the knife body immediately replacing the displaced soil to close the formed slit and retain the dispensed material.

8 Claims, 5 Drawing Figures

ANHYDROUS KNIFE

BACKGROUND OF THE INVENTION

Liquid and gaseous anhydrous fertilizers are often introduced into the soil by slitting or plowing the soil to a predetermined depth and dispensing the fertilizer immediately behind the plow or knife. Rollers or other back fill apparatus usually follow the plow to close the formed slit and the subsoil dispensing of the fertilizer effectively introduces the nutrients at the location desired.

A number of configurations and designs of subsoil aerators, blades and plows have been proposed and typical examples are shown in U.S. Pat. Nos. 2,439,743; 2,619,054; 2,684,617; 2,849,970; 3,259,087; 3,919,951; 4,033,271; 4,132,181 and 4,201,142.

Existing apparatus for introducing fertilizer within the subsoil are usually fabricated of sheet metal or plate, including welded fabrication, and such apparatus wears quickly, requires frequent replacement, and does not provide complete protection of the dispenser tube.

It is an object of the inventon to provide an anhydrous knife for the subsoil dispensing of fertilizer wherein the knife comprises a long wearing body of cast metal.

Another object of the invention is to provide an anhydrous knife of cast metal wherein a dispensing tube is integrally cast within the material of the cast body.

A further object of the invention is to provide an anhydrous knife of cast metal construction which is of such configuration as to reduce the energy required to pull the knife through the soil and provide optimum wear resistance at those locations wherein maximum abrasion and wear occurs.

Yet another object of the invention is to provide an anhydrous knife of cast metal construction which is economical to produce, protects the injection orifices of the dispensing tube, and which quickly closes the slit defined in the earth to retain the deposited material.

In the practice of the invention, the anhydrous knife consists of an elongated body cast of metal, preferably a ductile iron, such as bainitic ductile iron, which is hardenable. The upper end of the body includes an attachment end defined by holes receiving bolts permitting the knife body to be detachably mounted to the carrier. The body central region includes a sharpened leading edge, and the lower end of the body is of an enlarged streamlined configuration defining a sacrificial metal mass having long wearing characteristics. The mass at the toe end of the body includes a trailing edge having recesses defined therein into which the dispensed material is injected. In this manner, the toe end mass protects the orifices of the dispensing tube.

A dispensing tube is integrally cast into the body configuration extending the length thereof. As the body material completely surrounds the tube, the tube is fully protected against damage from rocks and the like within the soil, and the lower end of the tube includes orifices communicating with the recesses defined in the toe end mass which are protected from direct engagement with a solid soil face.

A generally planar projection is homogeneously defined on the body extending from the trailing edge thereof, and is of such configuration and location as to immediately close the slit defined in the soil by the body as it moves therethrough. This "backfill" projection directs displaced and adjacent soil into the formed soil slit immediately after introduction of the fertilizer thereby retaining the fertilizer in the soil and insuring maximum utilization thereof. The backfilling and soil compacting projection is of a generally planar configuration obliquely oriented to the direction of knife movement to compress and compact the soil after being penetrated by the knife.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
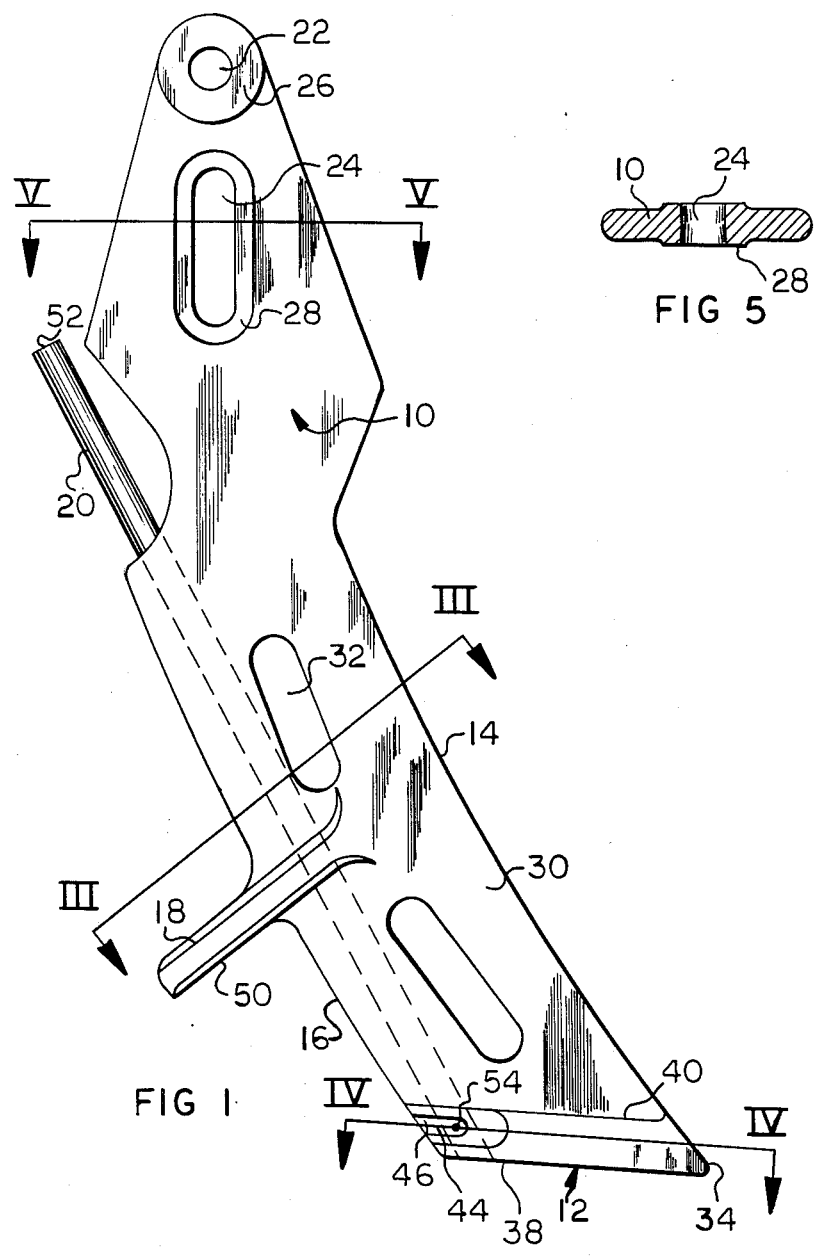
FIG. 1 is a side view of an anhydrous knife in accord with the invention.
Figure 5:
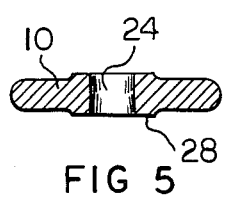
FIG. 5 is a sectional view taken along Section V—V of FIG. 1.
Figure 2:
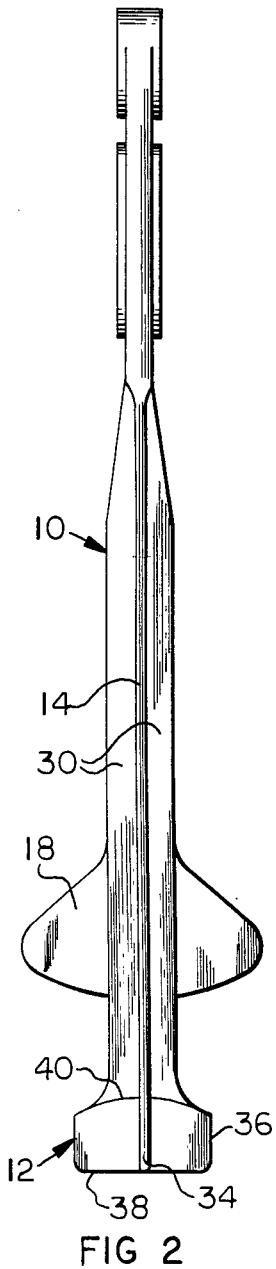
FIG. 2 is a front elevational view of the knife of FIG. 1.

With reference to FIGS. 1 and 2, the general configuration of an anhydrous knife in accord with the concepts of the invention will be appreciated. The upper end of the body 10 constitutes the attachment end, and at its lower toe end the body includes an enlarged sacrificial mass 12 of metal which extends forwardly of the general configuration of the body during installation and use. The body includes a leading edge 14 and a trailing edge 16 and a "beaver tail" soil compacting and refilling trench portion 18 homogeneously extends from the body rear edge. A dispensing tube 20 is cast into the configuration of the body and dispenses the fertilizer material therein adjacent the rear portion of the toe end mass 12 as later described.

The body 10 is of a cast metal construction, and preferably is cast of a hardenable ductile iron, such as bainitic ductile iron. Forming the body of a cast iron has the advantage of permitting the body to be shaped exactly as desired wherein the metal of the body may be increased in mass and thickness where maximum wear occurs, the front edge 14 of the body may be of a sharpened configuration to reduce the energy required to penetrate the soil, and the hardenability of the metal will increase the wear life. Also, the casting of the dispensing tube 20 into the body material permits the tube to be surrounded by the cast metal providing complete protection against tube damage, even during reverse movement of the apparatus when the knives are penetrating the soil.

Attachment of the body to the usual tractor-drawn apparatus, not shown, is by means of the holes 22 and 24 by bosses 26 and 28 encompassing the holes respectively, having parallel surfaces on opposite sides of the body configuration. Usually, the mounting structure, not shown, will be of the yoke configuration having spaced legs between which the body 10 is inserted and the tightening of bolts extending through holes 22 and 24 will attach the body to the supporting apparatus at the desired angle.

Figure 3:
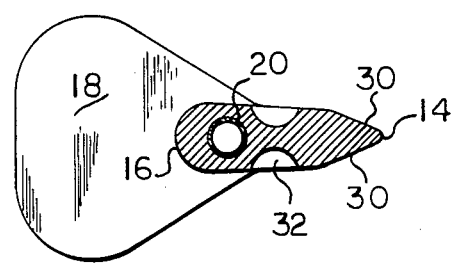
FIG. 3 is a plan, sectional view illustrating the soil backfill and compacting projection as taken along Section III—III of FIG. 1.

The body central region includes a leading edge 14, which includes converging surfaces 30, FIG. 3, to define a sharpened apex and portions of the central region may be indented as at 32 to reduce the amount of material required. As appreciated from FIG. 3 the trailing edge 16 of the body central region is rounded and this configuration insures adequate protection of the dispensing tube 20.

The lower end of the body 10 comprises a toe end defined by the enlarged mass 12. The mass includes a pointed apex 34 which is an extension of edge 14, lateral sides 36, a flat bottom surface 38, an upper surface 40, and a convex trailing edge 42. The enlarged mass 12 of the toe end defines sacrificial metal which extends the life of the knife over known constructions in that maximum wear occurs at this location. Also, it will be appreciated that the knife body and lead edge 14 is of a generally curved configuration of concave form which extends to the toe end and apex 34 ahead of the remainder of the body 10, and it is the toe end which normally engages rocks and other buried debris which impose the highest stresses and impact upon the body.

Figure 4:
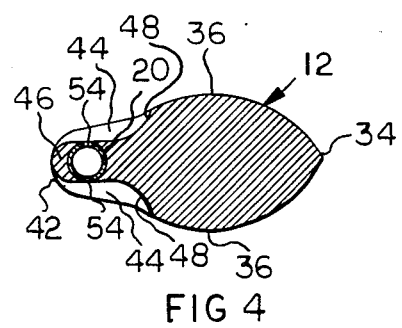
FIG. 4 is a plan, sectional view taken through the toe end mass along Section IV—IV of FIG. 1.

Adjacent its trailing edge 42 the toe end mass is formed with a pair of recesses 44 intersecting lateral sides 36 as will be appreciated from FIG. 4. The recesses 44 define a narrowed portion 46 of a thickness substantially equal to the outer diameter of the dispensing tube 20, as later described, and the recesses intersect the trailing edge 42, and forwardly, are defined by surfaces 48. As will be appreciated from the drawing, the portion 46 is centrally located with respect to the lateral sides 36 and is protected against direct engagement with a face of the soil being penetrated.

The "beaver tail" projection portion 18 is located upon the body central region and extends rearwardly from the trailing edge 16. The projection 18 is of a generally planar configuration, and the plane thereof is obliquely oriented to the general length of the toe mass 12 wherein the projection wide trailing edge is closer to the toe end than the narrower leading portion. The lower surface 50 of the projection 18 will engage the soil directly behind the knife and backfill the slit that has been formed and simultaneously compact the soil due to the oblique orientation of the projection. This immediate refilling of the slit and soil compaction after injection of the fertilizer will insure retention of the fertilizer, and distinguishes over more conventional fertilizing apparatus wherein slit backfilling and compaction is produced by rollers or other apparatus trailing the plow or knife. As will be appreciated from FIG. 3 the maximum width of the projection 18 is remote from the body 10 and the disclosed projection configuration makes the most efficient use of the cast metal of the body.

The dispenser tube 20, which may be of steel, brass or other material, is cast within the body 10. The tube includes an upper end 52 extending from the body for attachment to a flexible tube or hose through which the liquid or gas fertilizer is supplied. At its lower end, the tube is provided with a pair of diametrical opposed orifices 54, each of which communicates with a recess 44 which will be apparent from FIG. 4. As previously noted, the toe mass portion 46 is of a thickness substantially equal to the diameter of the tube 20 and the tube is cast therein. Drilling of the orifices 54 in the tube wall directly establishes communication with the recesses, and as the orifices 54 will be located behind the recess surfaces 48 the orifices will be protected against direct engagement with a soil face. Thus, the likelihood of the orifices becoming plugged and inoperative is substantially reduced over constructions wherein the dispenser tube orifice is more directly exposed to compacted soil.

The fact that the orifices 54 are inwardly set from the mass lateral sides 36 will also prevent compacted soil from engaging the orifices, and as the recesses 44 intersect the toe end mass trailing edge 42, the discharged fertilizer will readily flow into the slit defined by the toe end mass, and is retained therein by the immediate refilling and compaction of the formed slit by the projection 18.

From the above description it will be appreciated that the cast construction of the anhydrous knife of the invention provides numerous advantages over more conventional devices for the subsoil injection of fertilizer and it is apparent that various modifications to the inventive concepts may be apparent to those skilled in the art without departing from the spirit and scope of the invention.

We claim:

1. An anhydrous knife characterized by its long life and resistance to damage comprising, in combination, an elongated body of homogeneous cast metal having a width defined by lateral sides, a lower toe end, an upper attachment end, an intermediate region, a forward edge and a trailing edge, a dispensing tube within said body extending from adjacent said upper end through said intermediate region to said lower toe end having an accessible upper supply end and a lower dispensing end, said dispensing tube being integrally cast within the configuration of said body and surrounded and protected by the material of said body from adjacent said upper attachment end to said lower toe end, an opening defined in said tube lower end adjacent said body toe end permitting dispensing adjacent said toe end, said lower body toe end being of a homogeneous enlarged, elongated configuration defining a mass of cast sacrificial metal to extend the wear life of said body having a pointed apex defining a portion of said body forward edge and side portions laterally extending beyond the projection of said body lateral sides.

2. In an anhydrous knife as in claim 1, said body being formed of a cast ductile iron.

3. In an anhydrous knife as in claim 2, said body being formed of a hardened ductile iron.

4. In an anhydrous knife as in claim 2, a slit sealing projection homogeneously defined on said body intermediate region extending rearwardly of said trailing edge.

5. In an anhydrous knife as in claim 4, said sealing projection being of a substantially planar configuration having a generally tapered plan configuration having a minimum width adjacent said body and a maximum width remote from said body, said maximum width being closer to said toe end than said minimum width to compact soil displaced by said toe end.

6. In an anhydrous knife as in claim 1, a recess defined in said toe end at said trailing edge, said tube opening communicating with said recess whereby said recess protects said opening from clogging.

7. In an anhydrous knife as in claim 1, said toe end including a homogeneous wing at said trailing edge inwardly recessed from said toe end mass side portions defining a recess on each lateral side of said wing, said dispensing tube lower end being located within said wing and said tube opening communicating with a toe end recess whereby said recess protects said opening from clogging by soil.

8. In an anhydrous knife as in claim 7, a pair of openings defined in said tube lower end, an opening communicating with each toe end recess.

* * * * *